(12) United States Patent
Ferkul

(10) Patent No.: US 10,391,916 B2
(45) Date of Patent: Aug. 27, 2019

(54) EXTENDABLE TILT ASSEMBLY SYSTEM

(71) Applicant: Martin P. Ferkul, Eveleth, MN (US)

(72) Inventor: Martin P. Ferkul, Eveleth, MN (US)

(*) Notice: Subject to any disclaimer, the term of this patent is extended or adjusted under 35 U.S.C. 154(b) by 0 days.

(21) Appl. No.: 15/798,135

(22) Filed: Oct. 30, 2017

(65) Prior Publication Data
US 2018/0118077 A1 May 3, 2018

Related U.S. Application Data

(60) Provisional application No. 62/496,900, filed on Oct. 31, 2016.

(51) Int. Cl.
| | | |
|---|---|---|
| *B60R 5/04* | (2006.01) | |
| *B60P 1/00* | (2006.01) | |
| *B60P 1/32* | (2006.01) | |
| *B60R 11/06* | (2006.01) | |
| *B60R 9/06* | (2006.01) | |
| *B60R 9/042* | (2006.01) | |
| *B60R 11/00* | (2006.01) | |

(52) U.S. Cl.
CPC ............. *B60P 1/003* (2013.01); *B60P 1/32* (2013.01); *B60R 5/041* (2013.01); *B60R 9/042* (2013.01); *B60R 9/065* (2013.01); *B60R 11/06* (2013.01); *B60R 2011/005* (2013.01); *B60R 2011/0029* (2013.01); *B60R 2011/0036* (2013.01)

(58) Field of Classification Search
CPC ...... B60P 1/28; B60P 1/16; B60P 1/32; B60P 3/42; B60P 1/14; B60P 1/64; B60P 1/165; B60P 1/286; B60R 9/00; B60R 11/00; B60R 2011/004

USPC .......... 410/80, 68, 71, 77, 82; 414/522, 498, 414/686, 812, 563, 540, 917, 111; 296/10, 26.09, 57.1, 50, 43, 26.1

See application file for complete search history.

(56) References Cited

U.S. PATENT DOCUMENTS

| | | | |
|---|---|---|---|
| 3,544,155 A | 12/1970 | Gardner | |
| 4,111,481 A | 9/1978 | Nix | |
| 4,161,335 A | 7/1979 | Nix | |
| 4,522,326 A * | 6/1985 | Tuohy, III | B60R 11/06 224/310 |
| 4,671,561 A * | 6/1987 | Axelson | B62D 33/037 296/186.4 |
| 4,707,016 A | 11/1987 | McDonald | |
| 5,000,503 A | 3/1991 | Bernatek | |
| 5,518,287 A * | 5/1996 | Totani | B60P 1/26 296/50 |
| 6,431,630 B1 | 8/2002 | Meinke | |
| 6,860,536 B1 * | 3/2005 | Schimunek | B60P 1/003 296/26.09 |
| 7,125,082 B2 * | 10/2006 | Copus | B60P 1/24 298/1 A |

(Continued)

*Primary Examiner* — D Glenn Dayoan
*Assistant Examiner* — Sunsurraye Westbrook
(74) *Attorney, Agent, or Firm* — Todd R. Fronek

(57) ABSTRACT

Improvements to U.S. Pat. No. 9,346,389, Cargo Handling System, are desirable in order to tilt either the lower or upper extendable assembly independently or together to facilitate proper cleaning and to increase options for tilting, hauling, loading, and unloading purposes. The Extendable Tilt Assembly System is created by adding a tailgate guide assembly and modifying the guide assembly, the lower extendable assembly and the upper extendable assembly of U.S. Pat. No. 9,346,389.

9 Claims, 16 Drawing Sheets

(56) References Cited

U.S. PATENT DOCUMENTS 7,399,038 B2 * 7/2008 Vandewinckel ....... B62D 33/02
                                                   296/10
9,346,389 B2    5/2016  Ferkul

* cited by examiner

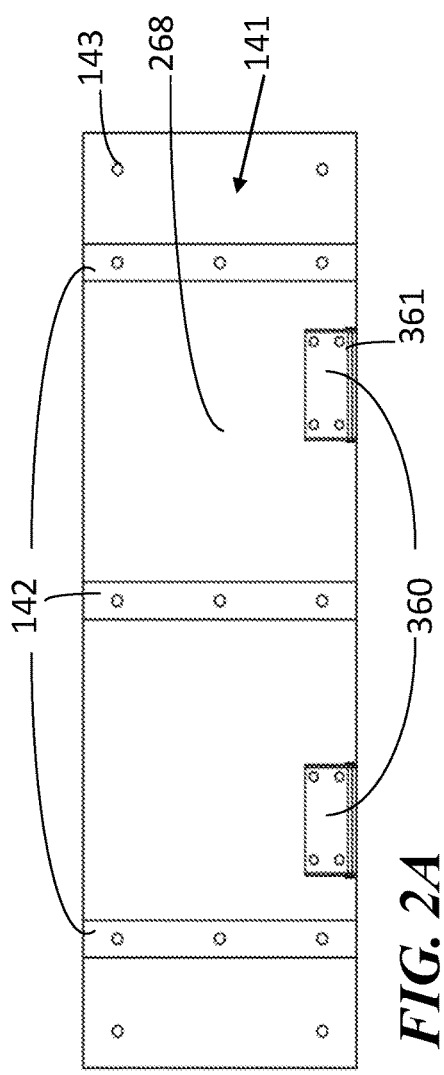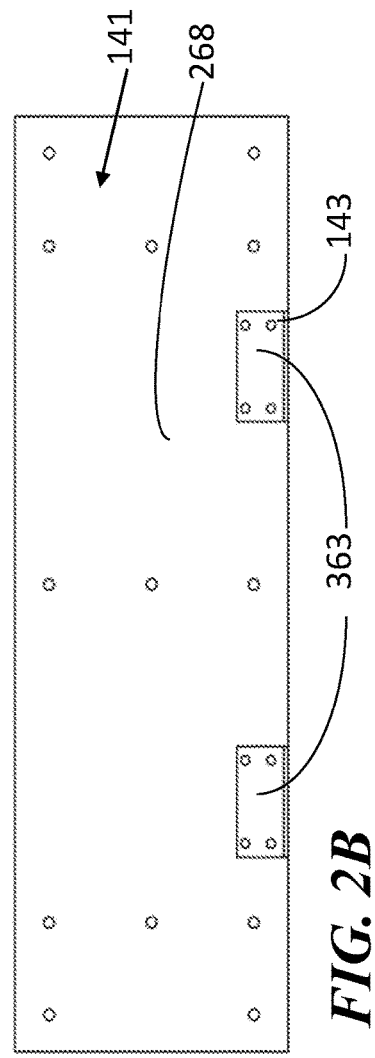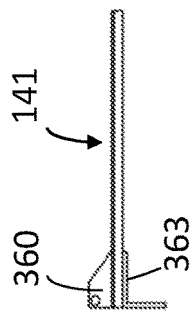

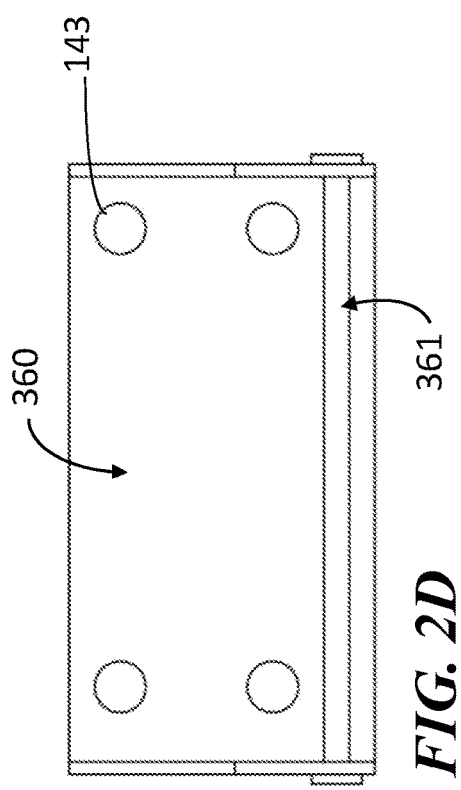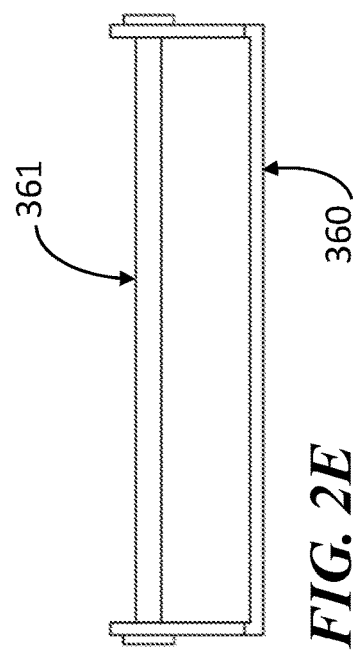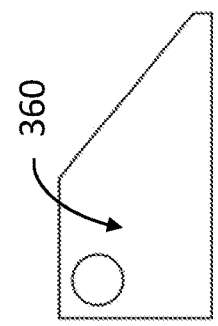

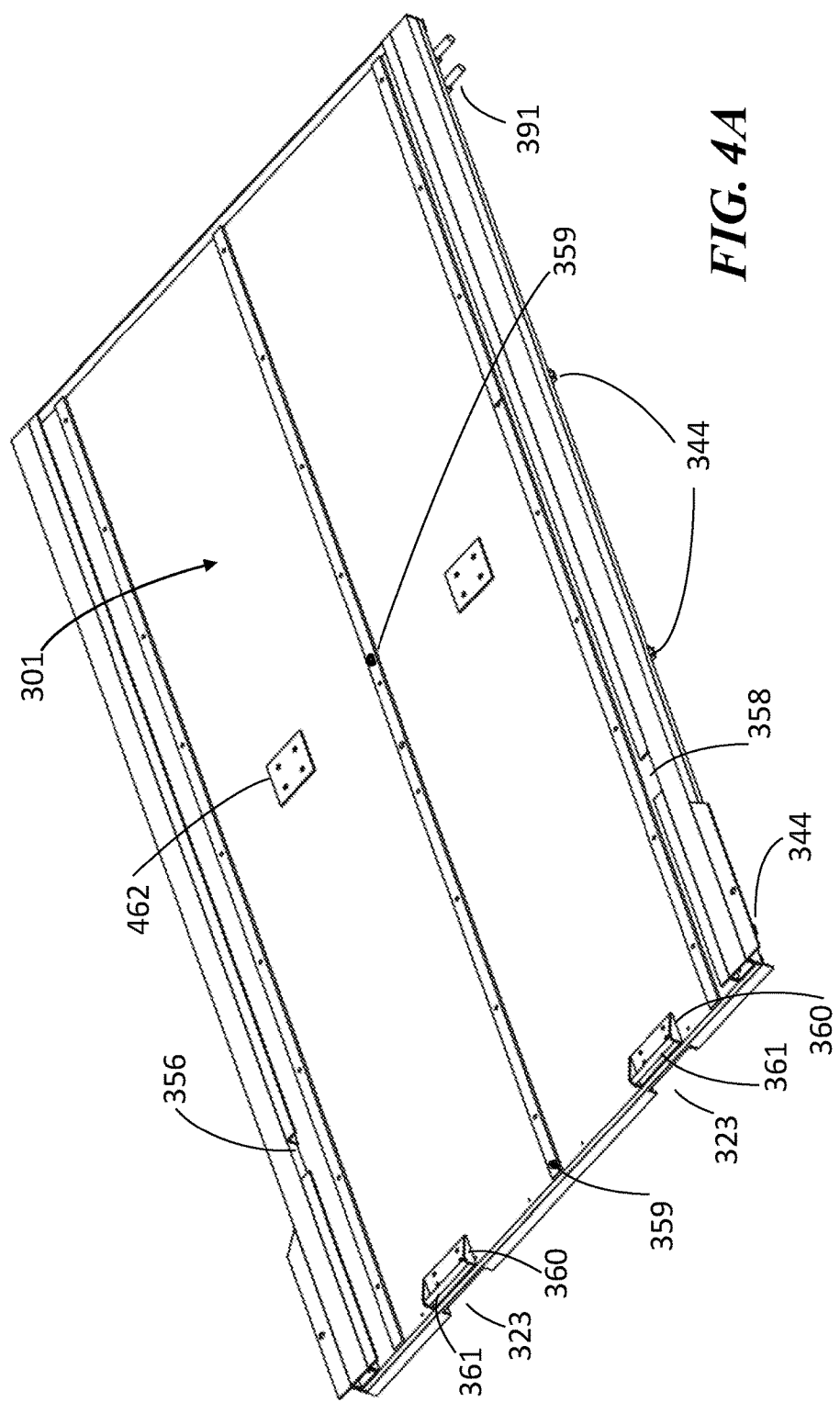

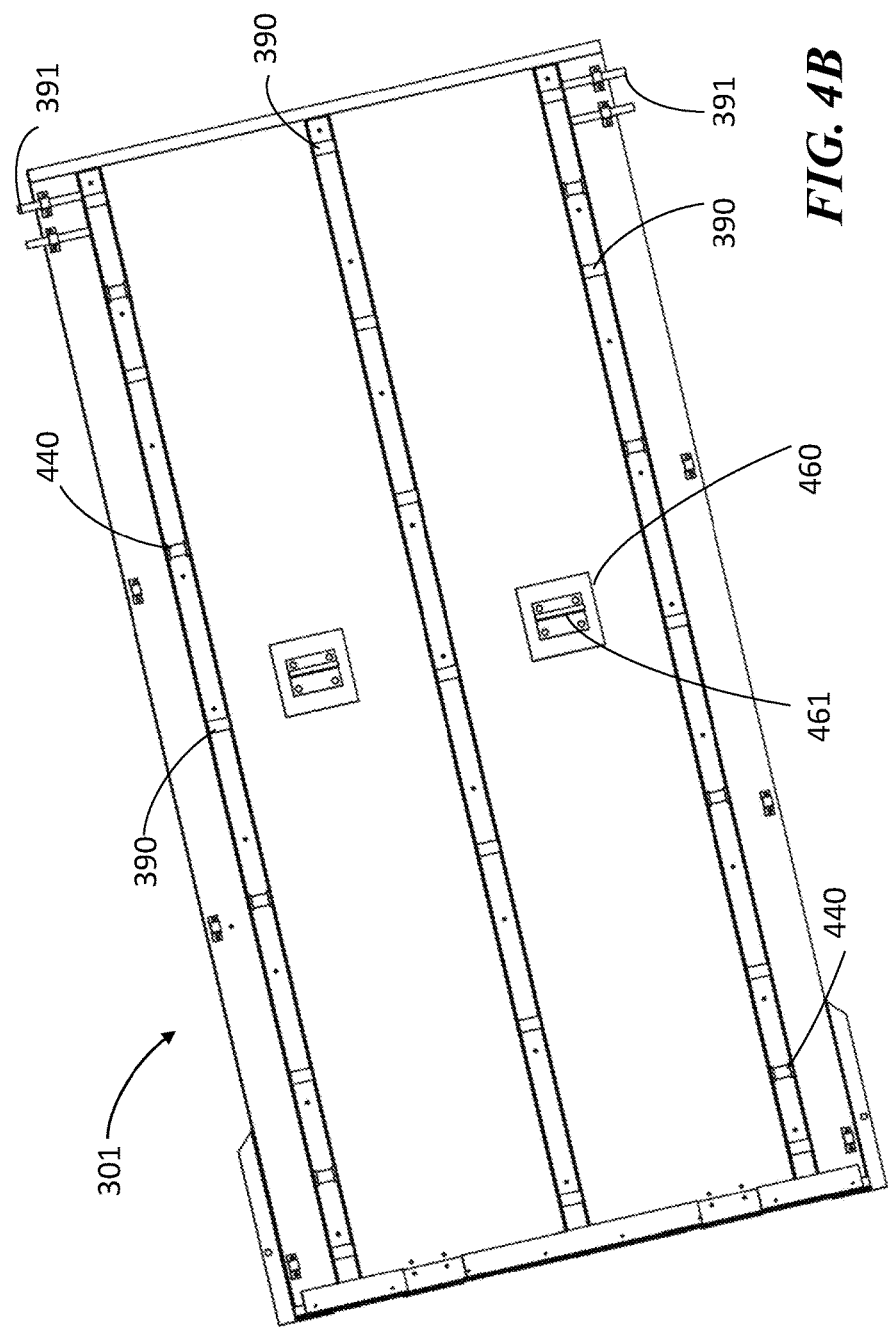

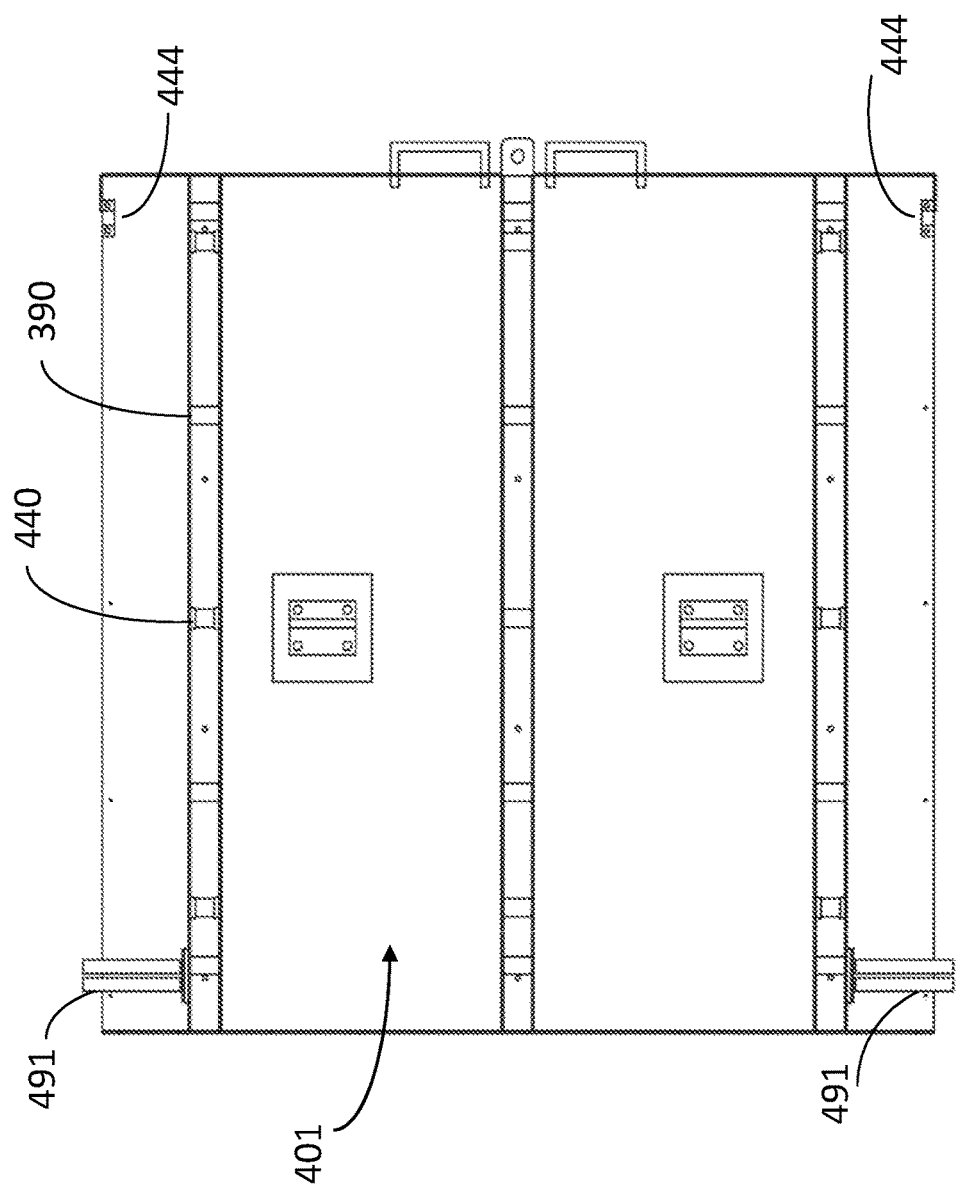

EXTENDABLE TILT ASSEMBLY SYSTEM

CROSS-REFERENCE TO RELATED APPLICATION

This application claims the benefit of U. S. Provisional Application No. 62/496,900, entitled "Extendable tilt assembly system", filed Oct. 31, 2016, the disclosure of which is incorporated herein by reference in its entirety.

TECHNICAL FIELD

The present disclosure broadly relates to the extendable tilt assembly system of cargo handling systems.

BACKGROUND

Cargo is transported in pickup trucks and other load carrying vehicles, trailers, etc. in order to move it from one location to another. Various types of cargo can include groceries, sports equipment yard waste, demolition waste, construction materials, tools, garbage, welders, compressors, fuel tanks and the like.

When placing cargo in the back of vehicles in the cargo bed, it is advantageous for a cargo handling system to be used which facilitates access to all parts of the cargo bed. Also of benefit is the ability to tilt cargo and dump it out when yard waste, demolition waste, gravel, aggregate work or garbage is hauled. The ability to remove various such items from the flush open end of the tailgate area or flush end of a trailer or load carrying vehicle by tipping one or more of the extendable assemblies is desirable, as is the ability for easily cleaning out (hosing out, sweeping, etc.) the cargo drawers used without over extending them or crazing into the cargo bed area.

The advantage of a cargo handling system is that it allows one to utilize the entire cargo bed area easily and effectively. Sometimes, however, the cargo bed in enclosed by a tonneau cover or topper adding to the difficulty of reaching transported cargo in the bed. And while pickup trucks remain quite popular, crossovers and other light vehicles are becoming more and more popular and are used more regularly to transport cargo under an enclosure.

When a type of cargo handling system is installed in the cargo bed area, flexible tilting of either drawer and the ability to clean out any remaining debris from the cargo transported is also necessary. Therefore, it is desirable to be able to tilt the drawers independently or together in order to release the transported cargo from both the lower drawer and upper drawer independently or affixed together. This cantilever function at the flush open end of the tailgate, or in instances where a tailgate is not present, provide one with the ability to turn any pickup truck, light load carrying vehicle, trailer, SUV, camper, etc. into a light dump truck. This feature is both of great advantage to the individual for ease of use and is economical.

For these reasons, U.S. Pat. No. 9,346,389 has been improved by modifying it in such a way that various embodiments of a new extendable tilt assembly system have been created.

SUMMARY

The present disclosure provides an Extendable Tilt Assembly System for vehicles by making improvements to U.S. Pat. No. 9,346,389 "Cargo Handling System". The improvements are desirable in order to enable ease and flexibility for cleaning purposes of the system and in order to tilt, haul, load, and unload cargo from both the upper and lower extendable assemblies either together or independently. This improvement is necessary since in U.S. Pat. No. 9,346,389 in its current configuration, the lower extendable assembly is unable to tilt either to release loads or for proper and easy cleaning purposes. In addition, due to the various loads and equipment (e.g., auxiliary fuel tanks) that may be mounted in pickups or other light vehicles, this improvement is necessary to provide more configuration options that allows for the independent or continued use of the assemblies of the Cargo Handling System of U.S. Pat. No. 9,346,389.

This document provides for the creation of an Extendable Tilt Assembly System to provide interchangeability and flexibility to be able to be used/changed in/into various configurations based on various needs of the user. The Extendable Tilt Assembly System is created by adding a tailgate guide assembly and a modified guide assembly, a modified lower extendable assembly and a modified upper extendable assembly as modified and improved from U.S. Pat. No. 9,346,389; or, by using the tailgate guide assembly together with the cargo handling system of U.S. Pat. No. 9,346,389; or, by attaching removable and retractable lower catch members and bars to a modified guide assembly and rolling the modified lower extendable assembly and/or a modified upper extendable assembly on it as modified and improved.

Accordingly, in one aspect, the present disclosure provides an Extendable Tilt Assembly System comprising:
  a tailgate guide assembly comprising:
    a tailgate protector that may be bent or formed over the edge of the tailgate and/or bumper with;
    at least two upward facing tailgate guide runners fastened to the tailgate protector;
    at least, one removable or retractable lower catch member and may have a removable bar added to the lower catch member, disposed adjacent to the back end of the tailgate protector; and
    whereby the tailgate guide assembly is either fastened to a tailgate or disposed over/fastened to a bumper.
  a cargo handling system of U.S. Pat. No. 9,346,389 and comprising of all applicable claims of U.S. Pat. No. 9,346,389 as needed and modified and improved in the following manner to create
  a modified guide assembly comprising:
    a guide assembly of U.S. Pat. No. 9,346,389 and comprising of all applicable claims of U.S. Pat. No. 9,346,389 as needed;
    the addition of one of more locking holes through the upward facing wheel runner:
    closeable top openings/cutouts may be added on the inner sides of both the first and second inward facing channels to allow for the tilt by the release of either adjustable stabilizer components which may be lockable on the modified upper extendable assembly or by the release of stabilizer components which may be lockable on the modified lower extendable assembly (described below) to tilt either the modified upper extendable assembly or modified lower extendable assembly independently or locked together;
    a modified guide assembly may be fastened on a cargo bed of a pickup truck or any other applicable vehicle's cargo bed; and a modified guide assembly may be constructed such that it is in and of itself the cargo bed of a given vehicle.

a modified lower extendable assembly comprising:
  a lower extendable assembly of U.S. Pat. No. 9,346,389 and comprising of all applicable claims of U.S. Pat. No. 9,346,389 as needed;
  the removal of the lower stabilizing wheels of U.S. Pat. No. 9,346,389 and replacing them with stabilizer components which may be lockable; and further modified by
  the addition of a plurality of tracking wheels to track the assembly;
  the addition of at least one upper catch member to facilitate the tilt function;
  the addition of cutouts on the back end of the modified lower extendable assembly disposed under the lower catch members in order to allow the passage of the modified lower extendable assembly over the tailgate guide assembly and its lower catch member(s) in order to facilitate the tilt function off of the tailgate guide assembly;
  closeable top openings/cutouts may be added on the inner sides of both the first and second inward facing channels to allow for the tilt by the release of adjustable stabilizer components which may be lockable on the modified upper extendable assembly (described below) to tilt the modified upper extendable assembly; and
  the modified lower extendable assembly may comprise of a plurality of cross members disposed on the lower bottom of its lower structure.

a modified upper extendable assembly comprising:
  an upper extendable assembly of U.S. Pat. No. 9,346,389 and comprising of all applicable claims of U.S. Pat. No. 9,346,389 as needed;
  the removal of upper stabilizing wheels of the upper extendable assembly of U.S. Pat. No. 9,346,389 and replacing them with adjustable stabilizer components which may be lockable;
  the addition of a plurality of both tracking and non-tracking wheels to roll on the upward facing wheel runners;
  the addition of locking members that enable the modified upper extendable assembly to be locked by the bolt or spring lock of modified guide assembly;
  the modified upper extendable assembly may comprise of a plurality of cross members disposed on its upper bottom of its upper structure; and
  the modified upper extendable assembly may comprise of at least two removable upwardly extending non-contiguous sidewalls.

The Extendable Tilt Assembly System eliminates the current necessity to climb or crawl into the cargo bed. Furthermore, a cargo tilting feature provided by the Extendable Tilt Assembly System allows for easy use and cleaning when heavy loads such as dirt, crushed rock, bricks, chopped wood, garbage, brush, etc. is hauled separately or there is a need to combine load(s) in/on both of the extendable assemblies in the cargo bed.

The Extendable Tilt Assembly System can be used as an accessory for a pickup truck or any other vehicle (with or without a tailgate or bumper) or trailer with a flat cargo area/bed such as sport utility vehicles, utility vans, light trucks, for example. Due to its ease of use, both professionals and amateurs can readily use it for various hauling and unloading tasks as it provides interchangeability and flexibility.

In another embodiment, the Extendable Tilt Assembly System is comprised of a tailgate guide assembly with the guide assembly, the lower extendable assembly and upper extendable assembly of U.S. Pat. No. 9,346,389. Additionally in another embodiment, a modified guide assembly with the addition of removable or retractable lower catch members can serve to tilt either the modified upper or modified, lower assembly or both when there is no need to use a tailgate guide assembly due to the absence of a tailgate or bumper on the vehicle or trailer. Extendable Tilt Assembly Systems can be sold as set out in this patent as an aftermarket vehicle (pickup truck or other, including campers, cargo bays of campers, trailers) accessory either as a kit or fully assembled.

Features and advantages of the present disclosures will be further understood upon consideration of the detailed description as well as the appended claims.

BRIEF DESCRIPTION OF THE DRAWINGS

FIG. 2A is a schematic top view of exemplary tailgate guide assembly

FIG. 2B is a schematic bottom view of exemplary tailgate guide assembly

FIG. 2C a side view of exemplary tailgate guide assembly

FIG. 2D a detailed top view of a lower catch member

FIG. 2E a front view of a lower catch member

FIG. 2F a side view of a lower catch member

FIG. 4A is a schematic top view of exemplary lower extendable assembly as modified to be used with the tailgate guide assembly.

FIG. 4B is a schematic bottom view of exemplary lower extendable assembly as modified to be used with the tailgate guide assembly.

FIG. 5 is a bottom view of the upper extendable assembly as modified.

FIG. 6B both the modified lower extendable assembly and modified upper extendable assembly are locked together whereby the modified upper extendable assembly rolls directly on the modified lower extendable assembly which rolls directly on the modified guide assembly and tailgate guide assembly and is tilting.

FIG. 6C the modified upper extendable assembly rolls directly on the modified guide assembly and tailgate guide assembly and is tilting.

FIG. 6D is a schematic rear facing view of exemplary modified upper extendable assembly in a tilting configuration by using the tailgate guide assembly.

FIG. 6E the modified upper extendable assembly rolls on the modified lower extendable assembly which rolls on the modified guide assembly and the tailgate guide assembly and tilts in a similar fashion to that of the Cargo Handling System of U.S. Pat. No. 9,346,389.

Figure 1:
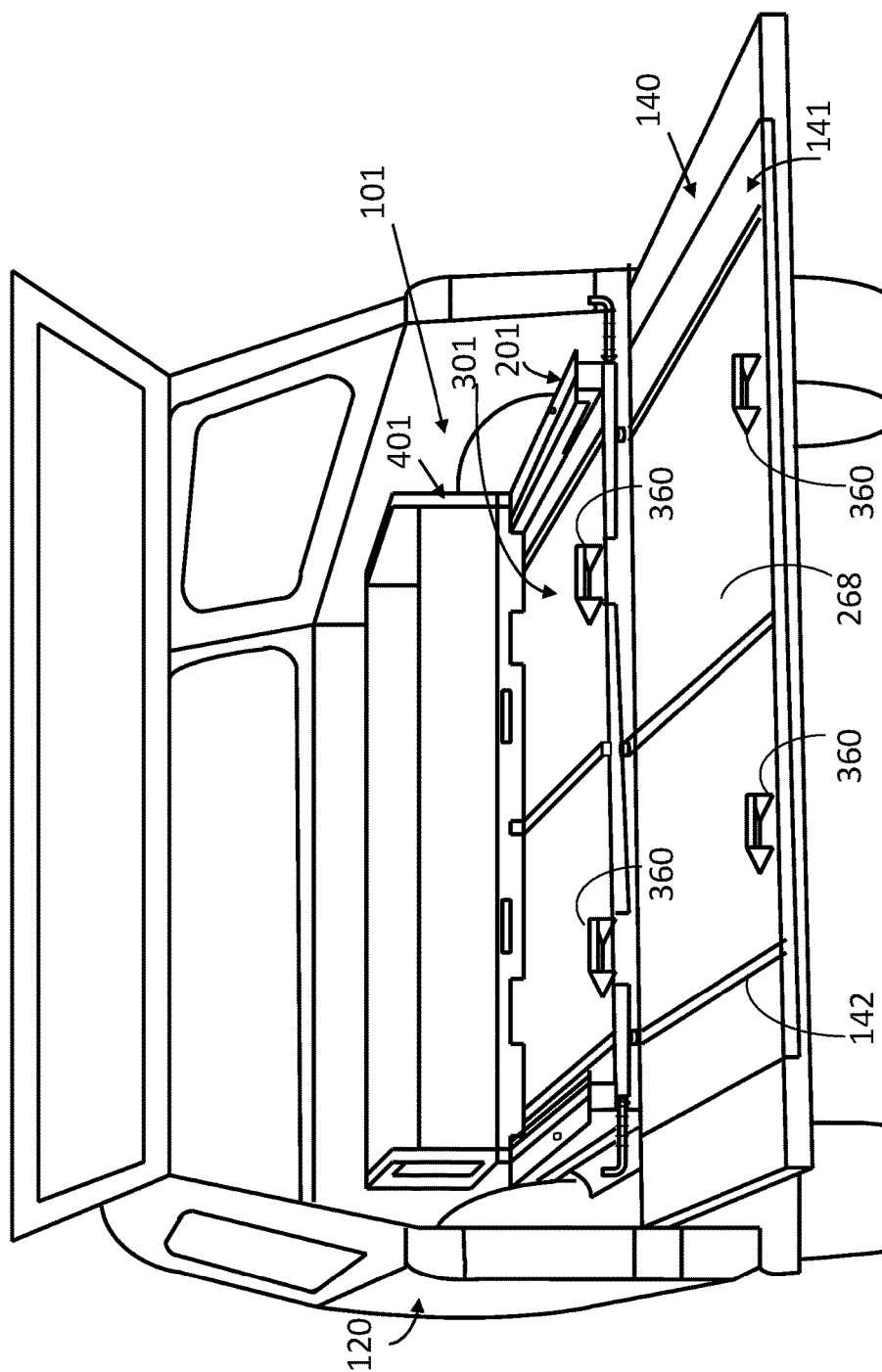
FIG. 1 is a schematic rear perspective view showing tailgate guide assembly and extendable tilt assembly system in a retracted transport configuration secured to a cargo bed of a pickup truck.

Numbering on pictures originates from U.S. Pat. No. 9,346,389 whereby various alterations and modifications have been made. Wherever possible or necessary, the improvements to U.S. Pat. No. 9,346,389 contain both additional, new parts as referenced on the pictures and old numbering that appears on U.S. Pat. No. 9,346,389 to avoid any confusion. Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

FIG. 1 is a schematic rear perspective view showing tailgate guide assembly 141 and extendable tilt assembly system 101 in a retracted transport configuration secured to a cargo bed of a pickup truck 120 whereby the tailgate protector 268 with at least one upward facing tailgate guide runner 142, at least one removable or retractable lower catch member 360 and removable bar disposed adjacent to the back end of the tailgate guide assembly either fastened to a tailgate 140 or disposed over a bumper. In the case of a pickup, the tailgate is lowered/opened and horizontally flush with the cargo bed. When the tailgate is in position, the lower catch members 360 may be fixed in place or raised from a possible retractable or removable position to allow for either the modified lower extendable assembly 301 or modified upper extendable assembly 401 or both modified extendable assemblies to tilt.

Further details concerning the various sub-assemblies of the Extendable Tilt Assembly System will now be discussed in further detail.

Figure 2G:
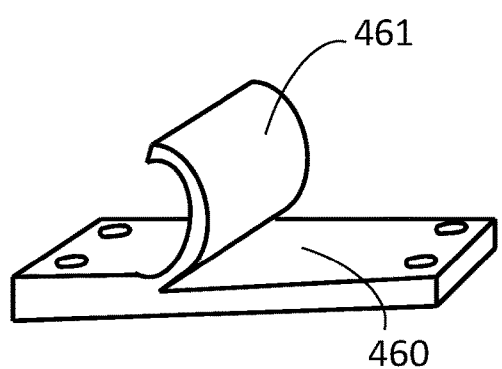
FIG. 2G a side view of a upper catch member

FIG. 2A is a schematic top view of exemplary tailgate guide assembly 141 comprising a tailgate protector 268 which may be flat, formed, or bent (90 degrees or as needed) over top of tailgate with at least one guide runner 142, at least one removable or retractable lower catch member 360 and removable bar 361 added to it. The tailgate guide assembly may be affixed to a tailgate by fasteners 143.

The tailgate guide assembly 141 has both a top and bottom face and may fit over the inside face of a tailgate 140, or may rest over the bumper and, work as a continuation of the guide assembly of U.S. Pat. No. 9,346,389 or modified guide assembly. Guide runners 142 may be included in the guide assembly to facilitate tracking of the modified lower extendable assembly 301 or the modified upper extendable assembly 401 and/or to provide a more even surface for the extendable assembly(ies) to roll on. While three optional upward facing guide runners 142 on the tailgate guide assembly unit are shown in FIG. 2A any number of guide runners may be used and may be made out of any suitable material. Examples of suitable materials include, wood, metal (as used herein the term 'metal' includes pure metals and alloys), and plastics (e.g., low density polyethylene (LDPE), high density polyethylene (HDPE), polypropylene, and engineering thermoplastics).

The tailgate guide assembly 141 may be made of any suitable material preferably stiff enough to provide a useful degree of impact protection to the cargo bed. Examples of suitable materials include, plywood, metal, and plastics (e.g., low density polyethylene (LDPE), high density polyethylene (HDPE), polypropylene, and engineering thermoplastics.

FIG. 2B is a schematic bottom view and FIG. 2C is a schematic side view of exemplary tailgate guide assembly. The lower catch member(s) 360 may be positioned at one or more desired locations on the tailgate guide assembly 141 whereby a lower plate 363 may be fastened to the underside of the assembly with fasteners 143.

FIGS. 2D-2G The lower catch member(s) 360 engage(s) the upper catch members) 460 at the hook(s) 461 of the upper catch member(s) and at the bar(s) 361 of the lower catch member(s). The bar(s) 361 may be removable. The lower and upper catch members, bars, hooks, lower plates and fasteners 143 can be made of any suitable material. Examples of suitable materials include, wood, metal (as used herein the term "metal" includes pure metals and alloys), and plastics (e.g., low density polyethylene (LDPE), high density polyethylene (HDPE) polypropylene, and engineering thermoplastics).

Figure 3:
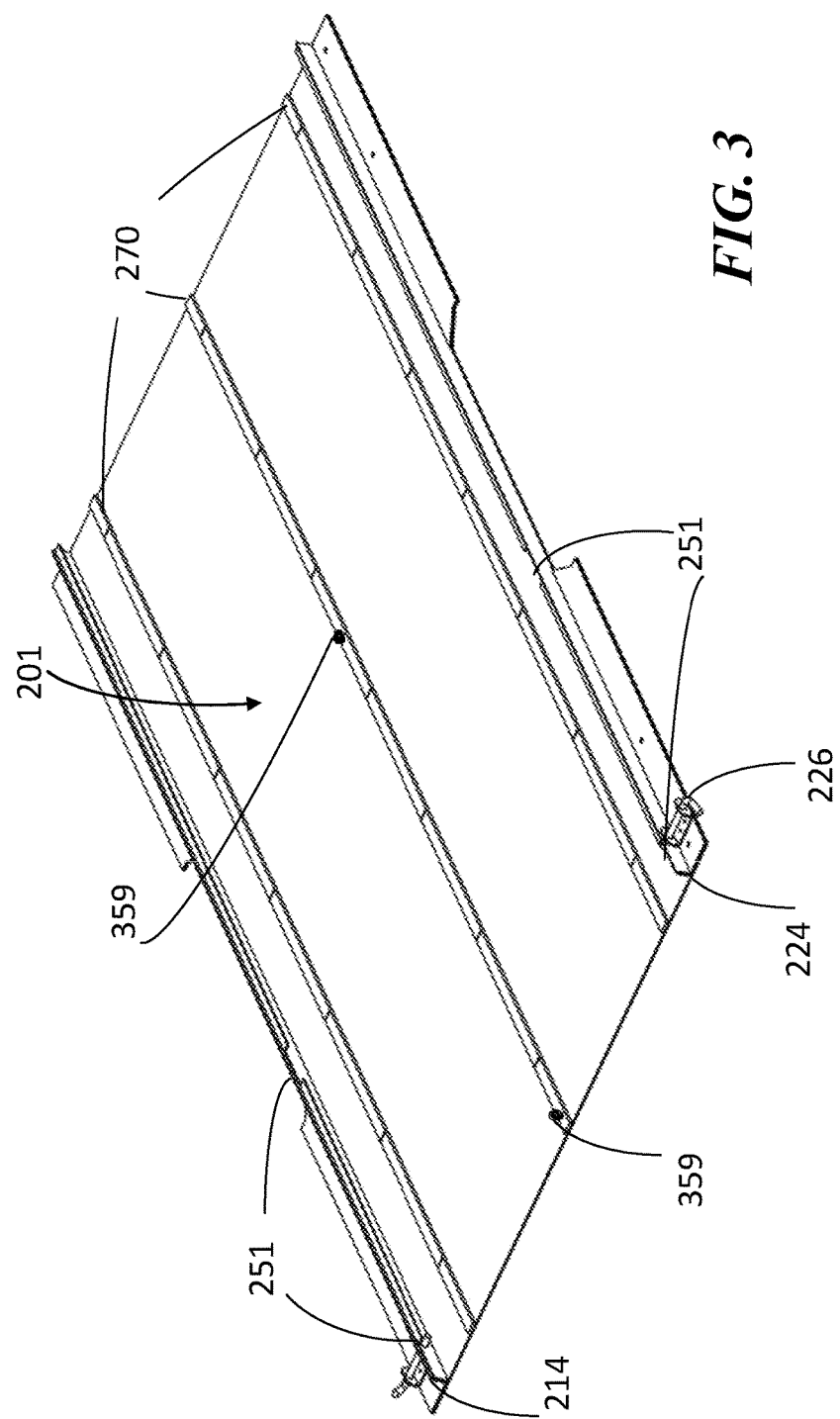
FIG. 3 is a schematic top view of exemplary guide assembly as modified for use with the tailgate guide assembly.

Locking member 226 may lock (FIG. 3) either the modified upper or modified lower assembly, whichever is rolling on the upper facing guide runners 270 of which at least two or more upper facing guide runners 270 are on the modified guide assembly.

The locking holes 359 are for use with the modified upper extendable assembly independently rolling on the modified guide assembly 201 in order to secure the modified upper extendable assembly nearest the cab when rolling directly on the modified guide assembly.

There may be plurality of closeable top opening 251 positioned in the first and second inward facing channel 214, 224 of the modified guide assembly 201 to allow the stabilizer components of the modified lower extendable assembly and adjustable stabilizer components of the modified upper extendable assembly to be freed to allow the assembly to tilt when the lower catch members of the tailgate guide assembly engage with the upper catch members and hook portion attached on the lower bottom or upper bottom of either the modified lower extendable assembly or the modified upper extendable assembly.

The closure of the closeable top openings 251 may be made of any similarly strong material used to construct the inward facing channels 214, 224.

Plate(s) 462 (FIG. 4A) may be added and affixed to the modified lower extendable assembly 301 to provide strength for the addition of the upper catch member(s) 460 and hook portion 461 (FIG. 4B) may be positioned near the middle tilting point on the lower bottom of the modified lower extendable assembly. In order for the modified lower extendable assembly to pass over the upper catch member(s) 360 of the tailgate guide assembly 141 on the lower back end of the modified lower guide assembly cutouts 323 (FIG. 4A) may be made in such positions as to allow the passage of the modified lower extendable assembly to engage in a tilting position once the upper and lower catch members are engaged.

The upper catch member(s) 460 are positioned and are adapted to hingably engage the lower catch member(s) 360 and bar(s) 361, respectively (See FIGS. 6A, 6B, 6C, 7).

While multiple upper and lower catch members are shown in the figures, single upper and/or lower catch members may also be used, A plurality of upper tracking wheels 440 found in U.S. Pat. No. 9,346,389 on the upper bottom structure of the upper extendable assembly are affixed to the lower bottom structure of the modified lower extendable assembly (FIG. 4B) to track the modified lower extendable assembly. The upper tracking wheels of the modified lower extendable assembly roll on the upper facing runners of the modified guide assembly and across the tailgate facing guide runners of the tailgate guide assembly. The modified lower extendable assembly is guided in this embodiment by tracking wheels. A plurality of wheels 390 of the guide assembly of U.S. Pat. No. 9,346,389 continue to be present on the modified lower extendable assembly.

A stabilizer component 391 is added to the modified lower extendable assembly and it replaces the lower stabilizing wheels of U.S. Pat. No. 9,346,389 which are removed. An stabilizer component may be made of any suitable material and consist of any suitable component with or without wheels and may include a locking member to prohibit tilting until meeting the optional closeable cutout 251 part in the inward facing channel of the modified guide assembly. The stabilizer component may be of any shape (e.g., flat, round, square, oval, elongated, etc.) that fits inside the inward facing channel of the modified guide assembly. Present on the modified lower extendable assembly may be optional closeable cutout(s) 356, 358 (FIG. 4A) which may help to release the adjustable stabilizer components of the modified upper extendable assembly.

When the modified upper extendable assembly or modified lower extendable assembly (whichever is rolling directly on the tailgate facing guide runners of the tailgate guile assembly) and wherein when said at least one lower catch member and said at least one upper catch member are hingably engaged, the back end of either the modified lower extendable assembly or modified upper extendable assembly can tilt downward.

The upper catch member(s) 460 are sufficiently durable and/or reinforced that they can stand up to repeated use with heavy cargos and made of any suitable material.

A plurality of cross members may be added to the lower structure of the modified lower extendable assembly. The cross members may be made of any suitable material (e.g., metal, plastics, wood, etc.) to provide additional strength to the structure.

Upper extendable assembly 401 (FIG. 5) benefits from the addition of at least one adjustable stabilizer component 491. When the adjustable stabilizer component is positioned such that it aligns with the inward facing channels 214, 224 of the guide assembly 201, the adjustable stabilizer component may be released via the optional closeable top openings 251 and allow for the tilt of the modified upper extendable assembly to occur upon the engagement of the upper and lower catch members and hooks.

Thus, when the modified upper extendable assembly tilts, the adjustable upper stabilizer components may lift up and out of the first and second inward facing channels 214, 224. Preferably, the adjustable upper stabilizer component is of sufficiently small size that it does not contact the first and second inward facing channel surfaces in the retracted configuration of the modified upper extendable assembly; however, in extended configurations it may be capable of rollably travelling along the upper surface of the inward facing channels thereby preventing the upper extendable assembly from tipping prematurely (e.g., before the upper and lower catch members are engaged) when cantilevered out beyond the tailgate guide assembly 141. An adjustable upper stabilizer component is secured to the upper structure by any suitable means (e.g., brackets, bolts, clamps and/or welds). Preferably, an adjustable upper stabilizer component is made of any suitable material. In order for the modified upper extendable assembly 401 to work properly in this embodiment whereby the assembly rolls directly on modified guide assembly 201, the adjustable upper stabilizer component 491 may be adjusted. If it becomes desirable to use the modified upper extendable assembly directly rolling on the modified lower extendable assembly, the adjustable stabilizer component may be adjusted.

When driving, in normal position, there may be an additional locking member 444 affixed to the upper structure 410 of the modified upper extendable assembly 401 that engages with the second locking member 216, 226 on the modified guide assembly.

In this option (FIG. 6A) of the extendable tilt assembly system 101, the modified lower extendable assembly 301 rolls directly on the modified guide assembly 201 whereby it may continue out on the tailgate guide assembly 141 and the adjustable stabilizer components 391 release from the optional closeable top openings/cutouts 251 are positioned in the first and second inward facing guide channel 214, 224 while the upper and lower catch member(s) and hook(s) engage and allow for the tilt of the modified lower extendable assembly, provided the lower catch member(s) of the tailgate guide assembly are affixed in a ready to engage position (whereby the bar 361 is in position on the lower catch member 360 affixed to the tailgate guide assembly 141) to accept the upper catch member(s) and hook(s).

In this option (FIG. 6B) of the extendable tilt assembly system 101, the modified upper extendable assembly 401 may be attached and locked to the modified lower extendable assembly 301 which rolls directly on the modified guide assembly 201 whereby both the modified upper and modified lower extendable assemblies locked together and continuing out on the tailgate guide assembly 141 activate the tilting of the modified lower extendable assembly as stabilizer components 391 release from the optional closeable top openings/cutouts 251 positioned in the first and second inward facing guide channel 214, 224 while the upper and lower catch member(s) and hook(s) engage and upon the engagement of the upper and lower catch member(s) and hook(s), provided the lower catch member(s) of the tailgate guide assembly are affixed in a ready to engage position (whereby the bar 361 is in position on the lower catch member 360 affixed to the tailgate guide assembly 141) to accept the upper catch member(s) and hook(s).

Figure 6A:
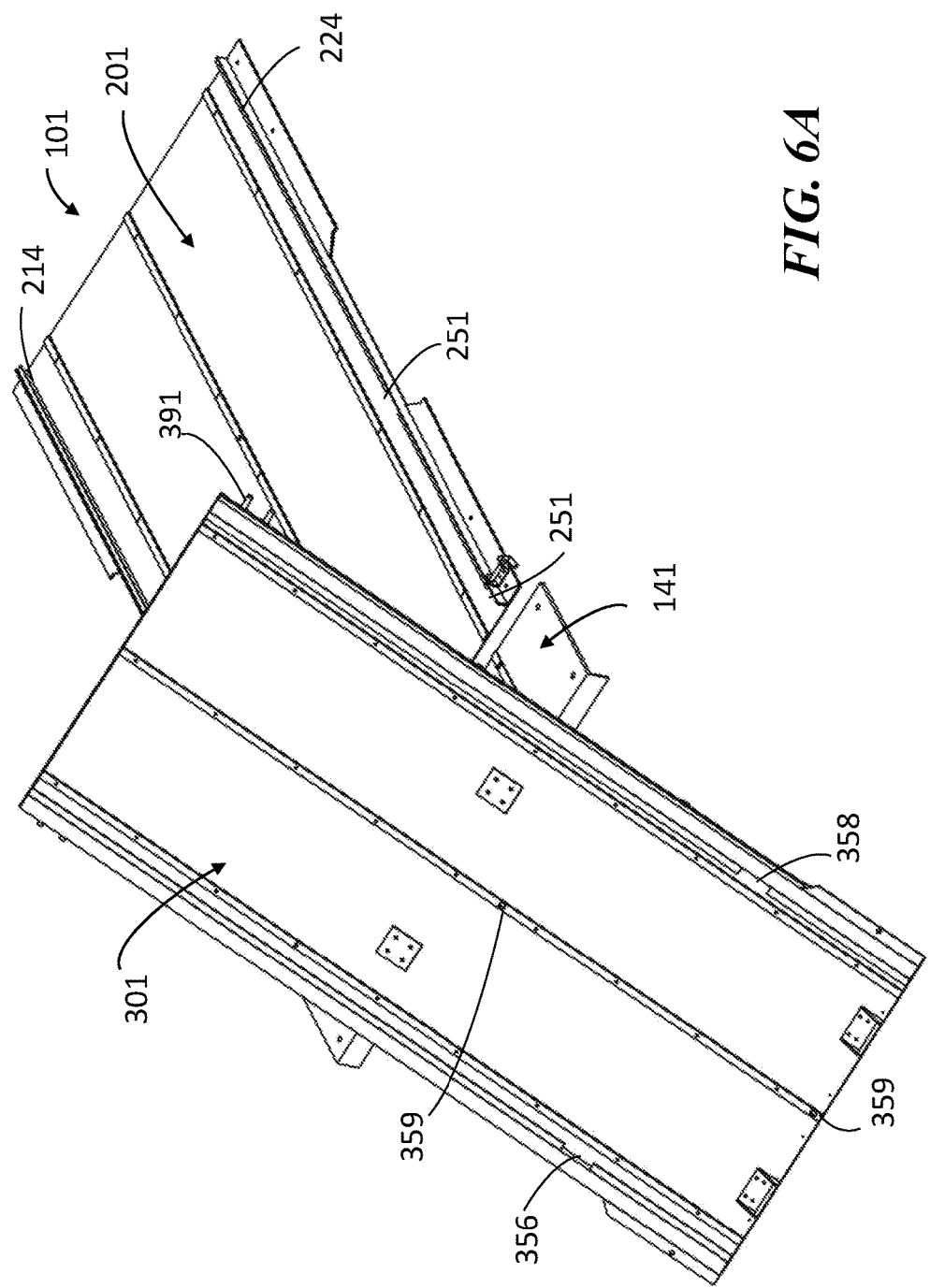
FIGS. 6A-6E are schematic perspective views of exemplary extendable tilt assembly system showing various configurations during use with exemplary tailgate guide assembly whereby in FIG. 6A the modified lower extendable assembly rolls directly on the modified guide assembly and tailgate guide assembly and is tilting.
Figure 6B:
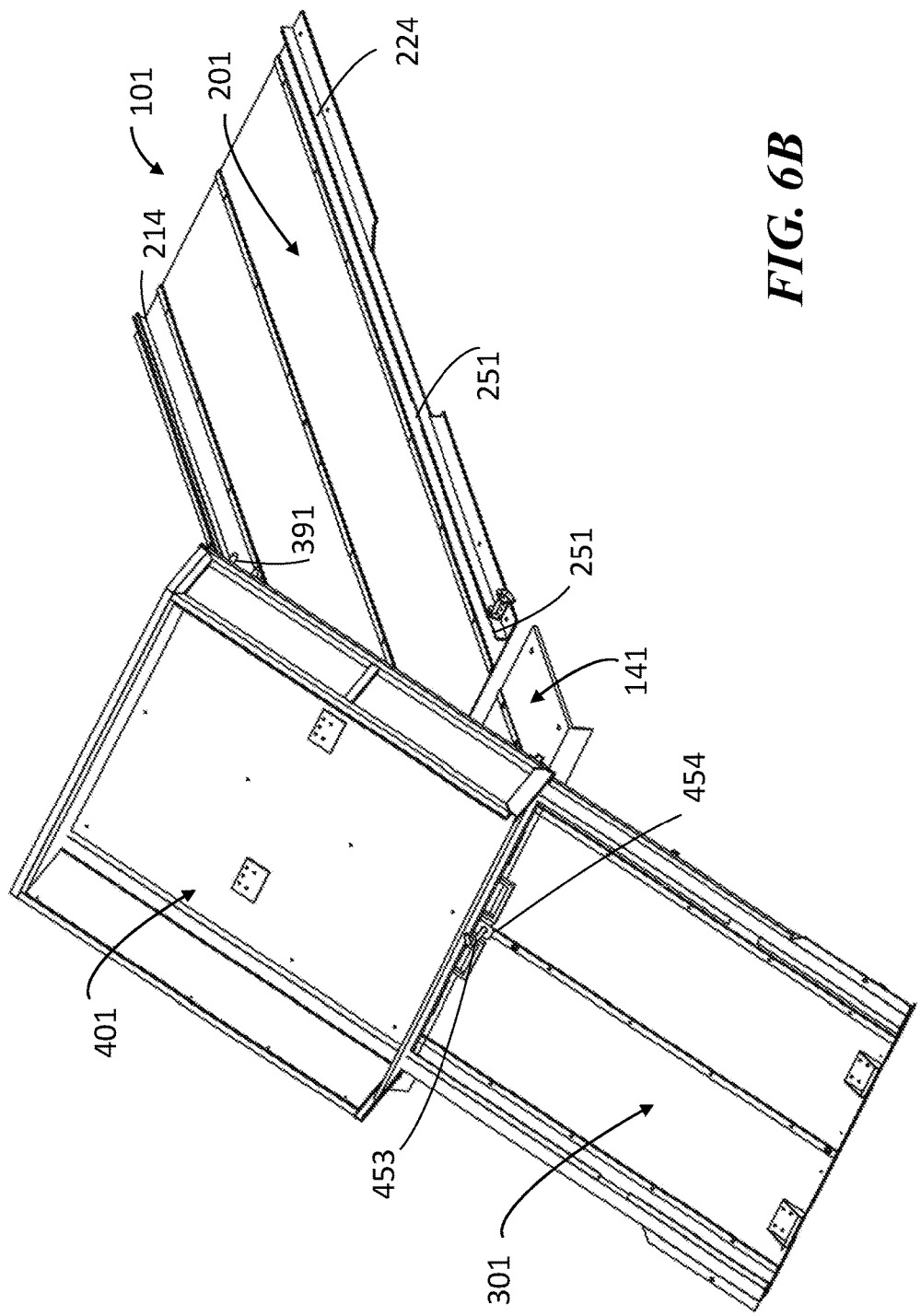
Figure 6C:
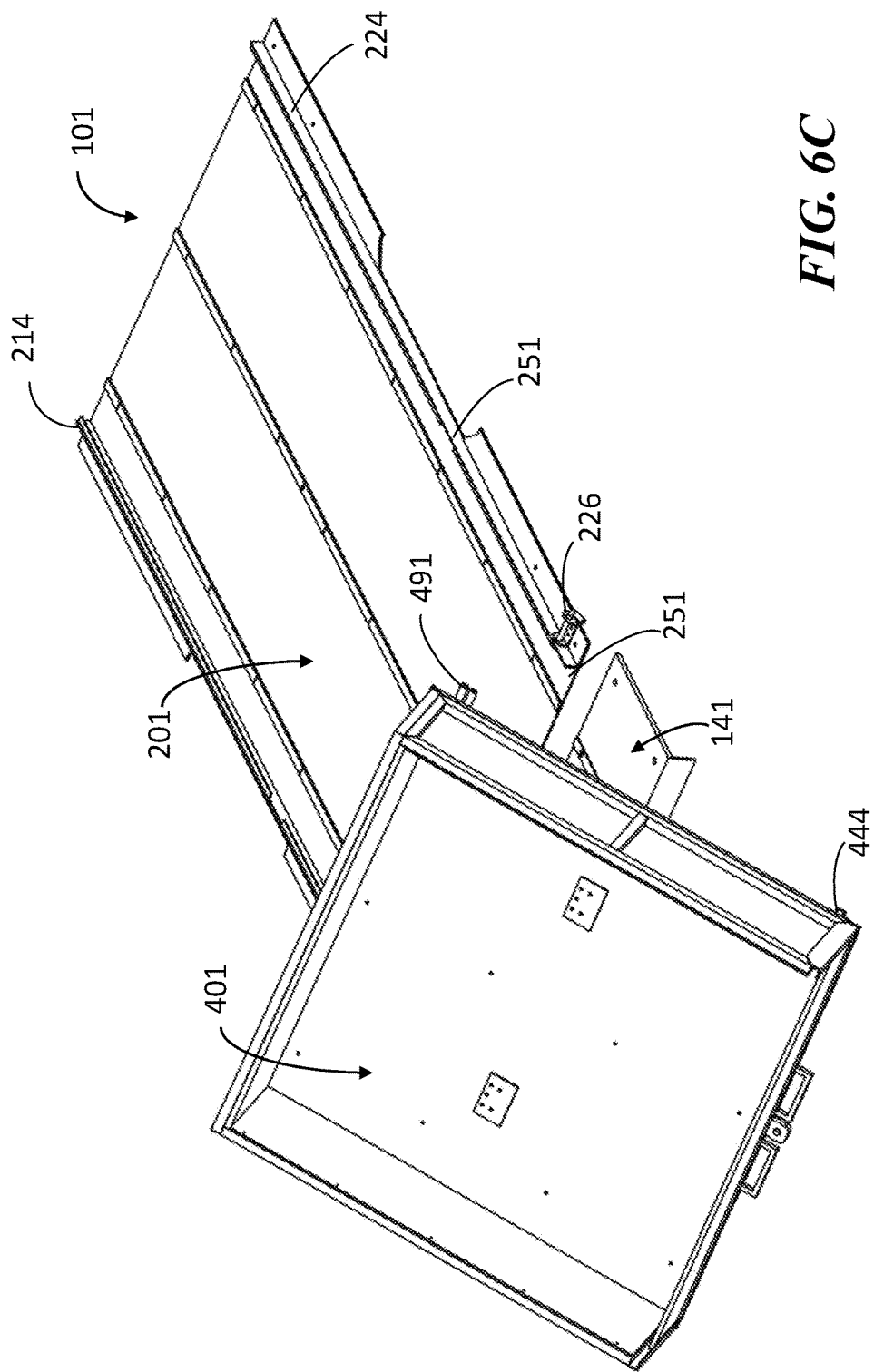
Figure 6D:
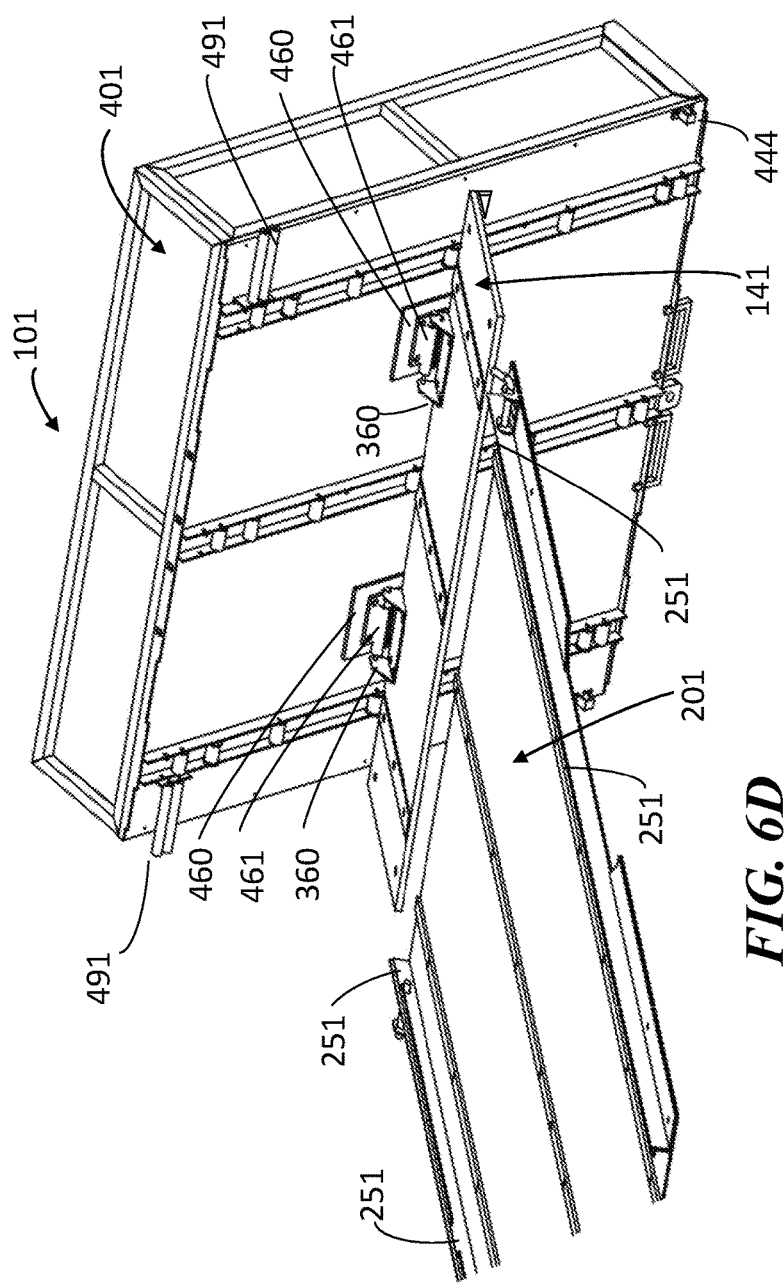

In this option (FIG. 6C-6D) of the extendable tilt assembly system 101, the modified upper extendable assembly 401 rolls directly on the modified guide assembly 201 whereby the modified upper extendable assembly continues out on the tailgate guide assembly 141 to activate the tilting of the modified upper extendable assembly, the locking member 226 disengages from locking member 444 and as it moves to the cantilever position, the adjustable stabilizer components 491 release from the optional closeable top openings/cutouts 251 positioned in the first and second inward facing guide channel 214, 224 while the upper and lower catch member(s) and hook(s) engage and upon the engagement of the upper and lower catch member(s) and hook(s), provided the lower catch member(s) of the tailgate guide assembly are affixed in a ready to engage position (whereby the bar 361 is in position on the lower catch member 360 affixed to the tailgate guide assembly 141) to accept the upper catch member(s) and hook(s).

Figure 6E:
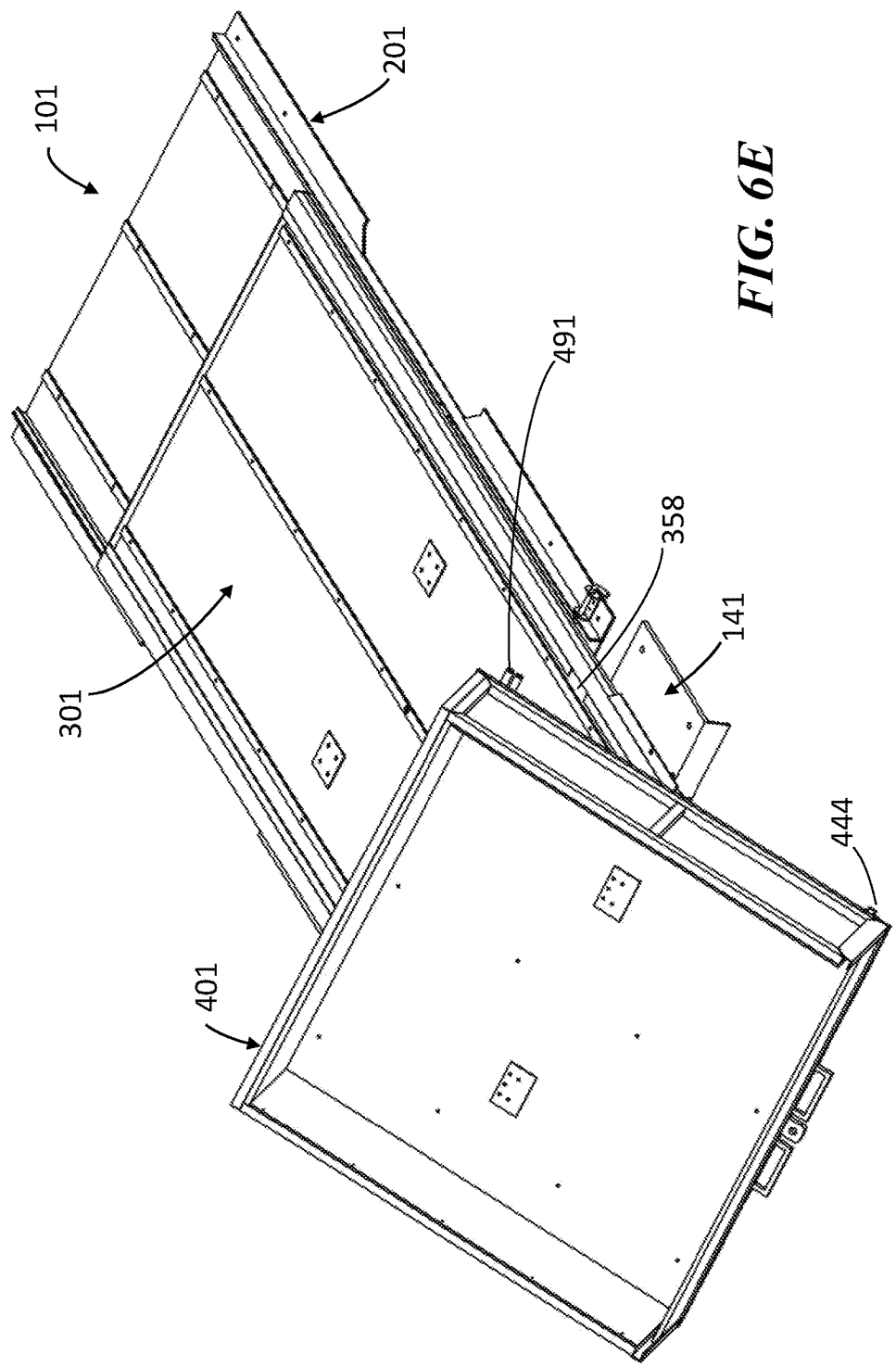
Figure 7:
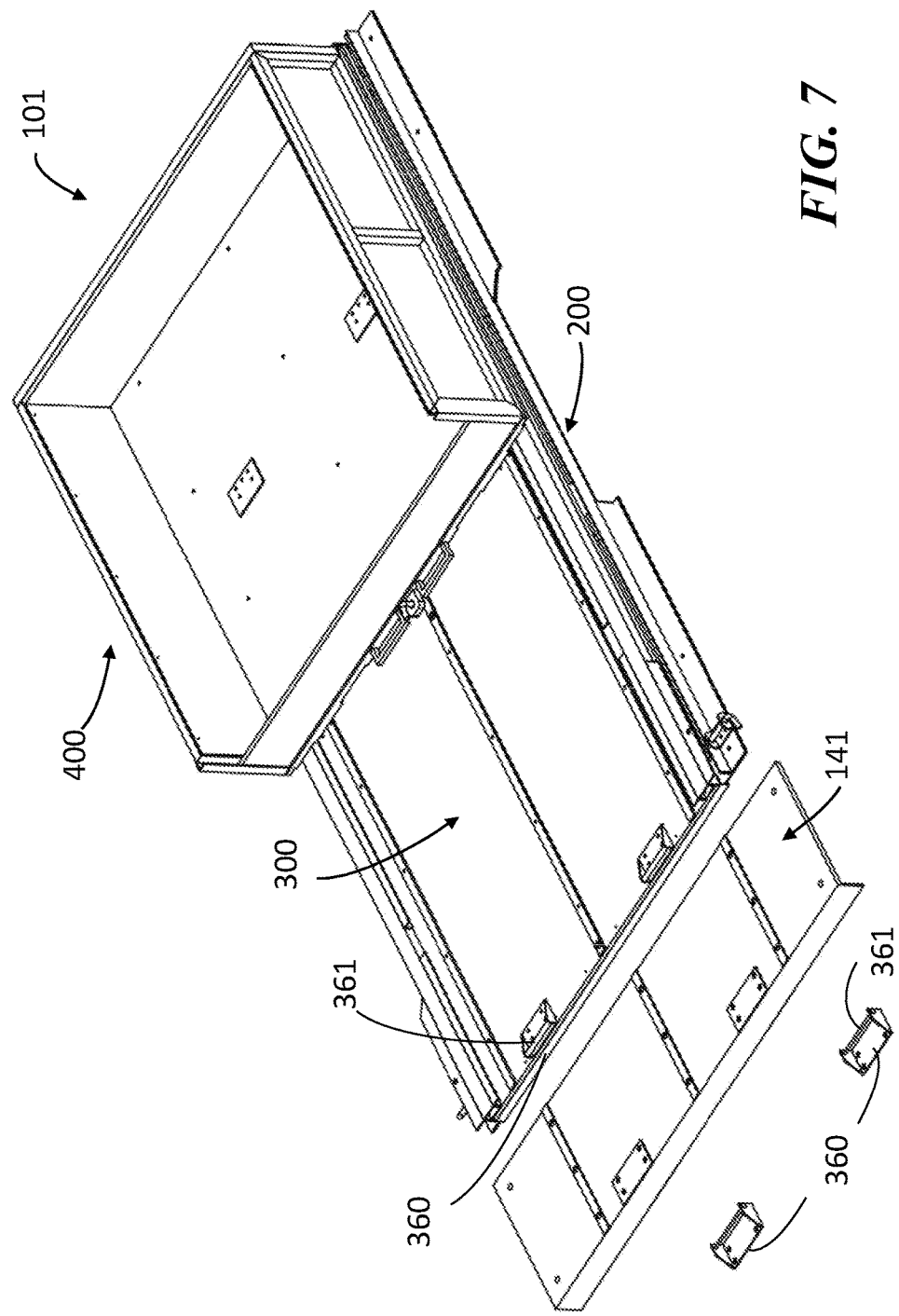
FIG. 7 An extendable tilt assembly system comprising of the tailgate guide assembly and the cargo handling system of U.S. Pat. No. 9,346,389 with the lower catch members removed from the tailgate guide assembly.

In this option (FIG. 6E) of the extendable tilt assembly system 101, the modified upper extendable assembly 401 rolls on the modified lower extendable assembly 301 which in turn rolls directly on the modified guide assembly 201 and tailgate guide assembly 141. In this instance, tilting may occur by engaging the lower and upper catch member(s) and hook(s) of the modified upper and modified lower extendable assemblies of the Cargo Handling system of U.S. Pat. No. 9,346,389 whereby the modified lower extendable assembly is out at the flush open end of the tailgate or slightly beyond and its lower catch member facilitates the tilt feature in a similar manner as described in U.S. Pat. No. 9,346,389.

A extendable tilt assembly system 101 (FIG. 7) comprising of a tailgate guide assembly 141 may be configured together with the cargo handling system of U.S. Pat. No. 9,346,389 whereby the removable or retractable lower catch members 360 and bars 361 are removed from the tailgate guide assembly. When this occurs, the cargo handling system of U.S. Pat. No. 9,346,389 consisting of a guide assembly 200, a lower extendable assembly 300 and an upper extendable assembly 400 as described and with all applicable claims of U.S. Pat. No. 9,346,389 can benefit from the tailgate guide assembly upon which the lower extendable assembly may continue to roll upon. The tailgate facing guide runners of the tailgate guide assembly may accept the wheels of the lower extendable assembly. All parts, movement and functionality of the cargo handling system of U.S. Pat. No. 9,346,389 is fully retained with the presence of a tailgate guide assembly which may be affixed by any appropriate means to a tailgate when present, or may rest over a bumper in the absence of a horizontal tailgate.

Figure 8A:
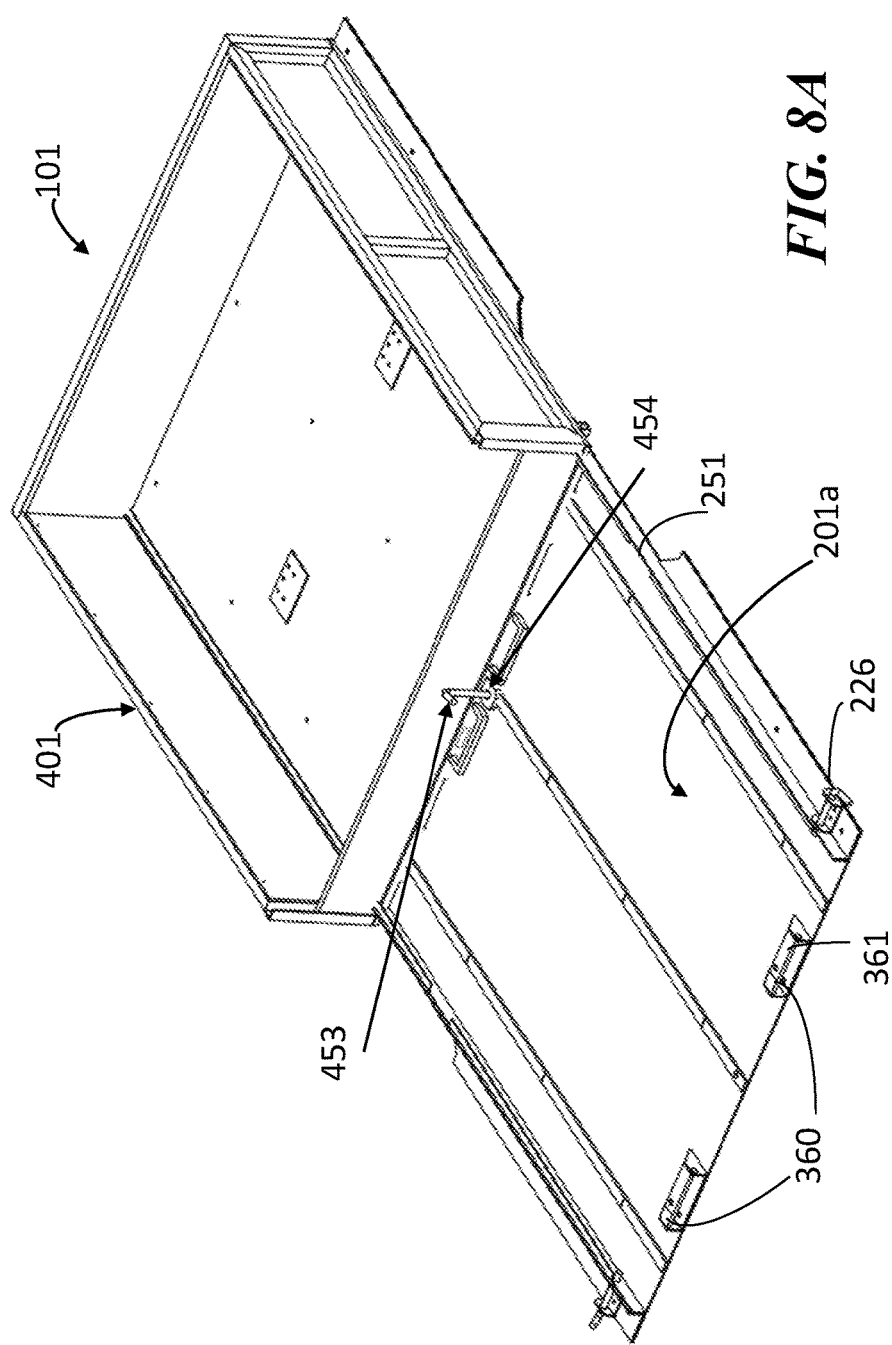
FIG. 8A An extendable tilt assembly system comprising of a further modified guide assembly together with the modified upper extendable assembly.

An extendable tilt assembly system 101 (FIG. 8A) comprising a further modified guide assembly 201a together with a modified upper extendable assembly 401. Alternatively the further modified guide assembly 201a may have a modified lower extendable assembly 301 roll upon it. The further modified guide assembly 201a may facilitate a tilting function of either the modified upper extendable assembly or the modified lower extendable assembly or both by adding at least one removable or retractable lower catch member 360 and at least one removable bar 361 disposed adjacent to the back end of the further modified guide assembly, and optional closeable cutout area 251 may be added which releases the stabilizer components and/or adjustable stabilizer components. Facilitating the tilt feature of either the modified upper extendable assembly or the modified lower extendable assembly rolling directly on the further modified guide assembly or both locked together rolling on the further modified guide assembly. Upon tilting, the removable or retractable lower catch member 360 and removable bar 361 engage with the one or more upper catch members 460 and hook(s) 461.

Figure 8B:
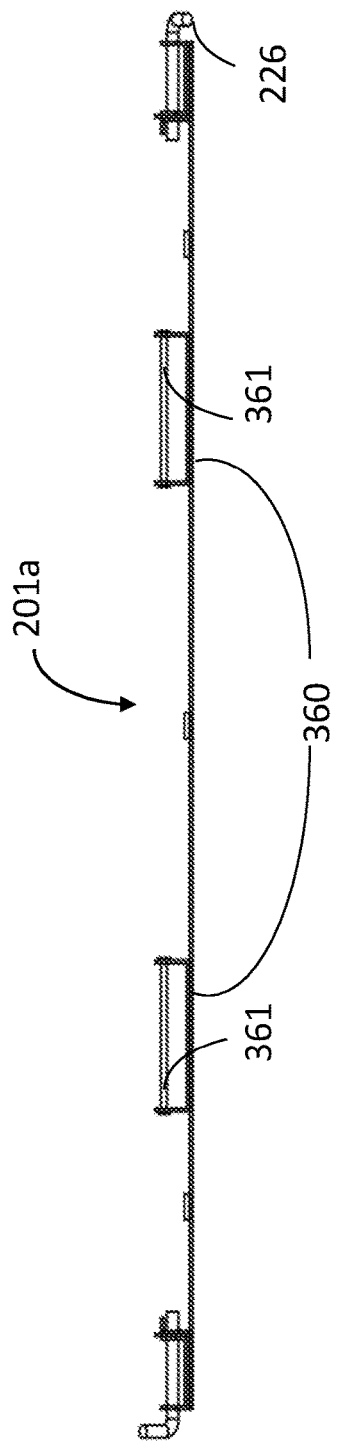
FIG. 8B The front view of the further modified guide assembly with the addition of the lower catch members.

The front view (FIG. 8B) of the tilt guide assembly 201a is highlighting the removable or retractable lower catch members 360 and removable bar 361 fastened directly to the modified guide assembly. This version of the extendable tilt assembly system, may be used when no horizontally extended tailgate and/or bumper is present, such as with a trailer, camper, or other light vehicle.

SELECT EMBODIMENTS OF THE PRESENT DISCLOSURE

In a first embodiment, the present disclosure provides an extendable tilt assembly system comprising:
 a tailgate guide assembly comprising:
  a tailgate protector that may be bent or formed over the edge of the tailgate and/or bumper with;
  at least two upward facing tailgate guide runners fastened to the tailgate protector;
  at least one removable or retractable lower catch member and may have a removable bar added to the lower catch member, disposed adjacent to the back end of the tailgate protector; and
 whereby the tailgate guide assembly is either fastened to a tailgate or disposed over/fastened to a bumper.
 a cargo handling system of U.S. Pat. No. 9,346,389 and comprising of all applicable claims of U.S. Pat. No. 9,346,389 as needed and modified and improved in the following manner to create
 a modified guide assembly comprising:
  a guide assembly of U.S. Pat. No. 9,346,389 and comprising of all applicable claims of U.S. Pat. No. 9,346,389 as needed;
  the addition of one of more locking holes through the upward facing wheel runner;
  closeable top openings cutouts may be added on the inner sides of both the first and second inward facing channels to allow for the tilt by the release of either adjustable stabilizer components which may be lockable on the modified upper extendable assembly or by the release of stabilizer components which may be lockable on the modified lower extendable assembly (described below) to tilt either the modified upper extendable assembly or modified lower extendable assembly independently or locked together;
  a modified guide assembly may be fastened on a cargo bed of a pickup truck or any other applicable vehicle's cargo bed; and
  a modified guide assembly may be constructed such that it is in and of itself the cargo bed of a given vehicle.
 a modified lower extendable assembly comprising:
  a lower extendable assembly of U.S. Pat. No. 9,346,389 and comprising, of all applicable claims of U.S. Pat. No. 9,346,389 as needed;
  the removal of the lower stabilizing wheels of U.S. Pat. No. 9,346,389 and replacing them with stabilizer components which may be lockable; and further modified by
  the addition of a plurality of tracking wheels to track the assembly;
  the addition of at least one upper catch member to facilitate the tilt function;
  the addition of cutouts on the back end of the modified lower extendable assembly disposed under the lower catch members in order to allow the passage of the modified lower extendable assembly over the tailgate guide assembly and its lower catch members) in order to facilitate the tilt function off of the tailgate guide assembly;
  closeable top openings/cutouts may be added on the inner sides of both the first and second inward facing channels to allow for the tilt by the release of adjustable stabilizer components which may be lockable on the modified upper extendable assembly (described below) to tilt the modified upper extendable assembly; and
  the modified lower extendable assembly may comprise of a plurality of cross members disposed on the lower bottom of its lower structure.
 a modified upper extendable assembly comprising:
  an upper extendable assembly of U.S. Pat. No. 9,346,389 and comprising of all applicable claims of U.S. Pat. No. 9,346,389 as needed;

the removal of upper stabilizing wheels of the upper extendable assembly of U.S. Pat. No. 9,346,389 and replacing them with adjustable stabilizer components which may be lockable;

the addition of a plurality of both tracking and non-tracking wheels to roll on the upward facing wheel runners;

the addition of locking members that enable the modified upper extendable assembly to be locked by the bolt or spring lock of modified guide assembly;

the modified upper extendable assembly may comprise of a plurality of cross members disposed on its upper bottom of its upper structure; and the modified upper extendable assembly may comprise of at least two removable upwardly extending non-contiguous sidewalls.

In a second embodiment, the present disclosure provides an, extendable tilt assembly system according to the first embodiment, whereby the modified lower extendable assembly can roll independently on the tailgate guide assembly and modified guide assembly without the presence of a modified upper extendable assembly.

In a third embodiment, the present disclosure provides an extendable tilt assembly system according to the first embodiment, whereby the modified upper extendable assembly can roll independently on the tailgate guide assembly and modified guide assembly without the presence of a modified lower extendable assembly.

In a fourth embodiment, the present disclosure provides an extendable tilt assembly system according to the first embodiment, wherein at least one removable or retractable lower catch member and removable bar is disposed adjacent to the back end of the modified guide assembly to create the further modified guide assembly.

In a fifth embodiment, the present disclosure provides an extendable tilt assembly system according to the fourth embodiment, whereby the modified lower extendable assembly can roll independently on the further modified guide assembly without the presence of both the tailgate guide assembly and the modified upper extendable assembly.

In a sixth embodiment, the present disclosure provides an extendable tilt assembly system according to the fourth embodiment, whereby the modified upper extendable assembly can roll independently on the further modified guide assembly without the presence of both the tailgate guide assembly and the modified lower extendable assembly.

In a seventh embodiment, the present disclosure provides an extendable tilt assembly system according to the fourth embodiment, whereby the modified upper extendable assembly rolls upon the modified lower extendable assembly which in turn rolls upon the further modified guide assembly without the presence of the tailgate guide assembly.

In a eight embodiment, the present disclosure provides for an extendable tilt assembly system comprising:
a tailgate guide assembly comprising:
a tailgate protector that may be bent or formed over the edge of the tailgate and/or bumper with at least two upward facing tailgate guide runners;
at least one removable or retractable lower catch member and may have a removable bar added to the lower catch member, disposed adjacent to the back end of the tailgate protector; and
whereby the tailgate guide assembly is either fastened to a tailgate or disposed over/fastened to a bumper.

What is claimed is:
1. An extendable tilt assembly system comprising:
a tailgate guide assembly comprising:
a tailgate protector that may be bent or formed over the edge of the tailgate and/or bumper;
at least two upward facing tailgate guide runners fastened to the tailgate protector;
at least one removable or retractable lower catch member and may have a removable bar added to the lower catch member, disposed adjacent to the back end of the tailgate protector; and
whereby the tailgate guide assembly is either fastened to a tailgate or disposed over/fastened to a bumper;
a cargo handling system comprising:
a guide assembly having one of more locking holes through the upward facing wheel runner, closeable top openings/cutouts may be added on the inner sides of both the first and second inward facing channels to allow for the tilt of portions of the cargo handling system independently or locked together;
wherein the guide assembly may be fastened on a cargo bed of a pickup truck or any other applicable vehicle's cargo bed; and
wherein the guide assembly may be constructed such that it is in and of itself the cargo bed of a given vehicle;
wherein at least one removable or retractable lower catch member and removable bar is disposed adjacent to the back end of the guide assembly;
a lower extendable assembly having stabilizer components which may be lockable; and further comprising:
a plurality of tracking wheels to track the assembly;
at least one upper catch member to facilitate the tilt function;
cutouts on the back end of the lower extendable assembly disposed under the lower catch members in order to allow the passage of the lower extendable assembly over the tailgate guide assembly and its lower catch member(s) in order to facilitate the tilt function off of the tailgate guide assembly;
closeable top openings/cutouts may be added on the inner sides of both the first and second inward facing channels to allow for the tilt by the release of adjustable stabilizer components which may be lockable on the upper extendable assembly to tilt the upper extendable assembly; and
the lower extendable assembly may comprise of a plurality of cross members disposed on the lower bottom of its lower structure; and
an upper extendable assembly having adjustable stabilizer components which may be lockable and further comprising:
a plurality of both tracking and non-tracking wheels to roll on the upward facing wheel runners;
locking members that enable the upper extendable assembly to be locked by the bolt or spring lock of the guide assembly;
the upper extendable assembly may comprise of a plurality of cross members disposed on its upper bottom of its upper structure; and
the upper extendable assembly may comprise of at least two removable upwardly extending non-contiguous sidewalls,
whereby the modified upper extendable assembly rolls upon the modified lower extendable assem- bly which in turn rolls upon the modified guide assembly without the presence of the tailgate guide assembly.

2. An extendable tilt assembly system of claim 1, whereby the lower extendable assembly can roll independently on the tailgate guide assembly and guide assembly without the presence of an upper extendable assembly.

3. An extendable tilt assembly system of claim 1, whereby the upper extendable assembly can roll independently on the tailgate guide assembly and guide assembly without the presence of a lower extendable assembly.

4. An extendable tilt assembly system of claim 1, whereby the modified lower extendable assembly can roll independently on the guide assembly without the presence of both the tailgate guide assembly and the upper extendable assembly.

5. An extendable tilt assembly system of claim 1, whereby the upper extendable assembly can roll independently on the guide assembly without the presence of both the tailgate guide assembly and the lower extendable assembly.

6. An extendable tilt assembly system comprising:
    a tailgate guide assembly comprising:
        a tailgate protector that may be bent or formed over the edge of the tailgate and/or bumper;
        at least two upward facing tailgate guide runners;
        at least one removable or retractable lower catch member and may have a removable bar added to the lower catch member, disposed adjacent to the back end of the tailgate protector; and
        whereby the tailgate guide assembly is either fastened to a tailgate or disposed over/fastened to a bumper;
    a cargo handling system comprising:
        a guide assembly;
        a lower extendable assembly;
        an upper extendable assembly, whereby the lower extendable assembly can roll independently on the tailgate guide assembly and guide assembly without the presence of an upper extendable assembly.

7. An extendable tilt assembly system of claim 6, whereby the upper extendable assembly can roll independently on the tailgate guide assembly and guide assembly without the presence of a lower extendable assembly.

8. An extendable tilt assembly system comprising:
    a tailgate guide assembly comprising:
        a tailgate protector that may be bent or formed over the edge of the tailgate and/or bumper;
        at least two upward facing tailgate guide runners;
        at least one removable or retractable lower catch member and may have a removable bar added to the lower catch member, disposed adjacent to the back end of the tailgate protector; and
        whereby the tailgate guide assembly is either fastened to a tailgate or disposed over/fastened to a bumper;
    a cargo handling system comprising:
        a guide assembly;
        a lower extendable assembly;
        an upper extendable assembly, whereby the upper extendable assembly can roll independently on the tailgate guide assembly and guide assembly without the presence of a lower extendable assembly.

9. An extendable tilt assembly system of claim 8, whereby the lower extendable assembly can roll independently on the tailgate guide assembly and guide assembly without the presence of an upper extendable assembly.

* * * * *